Figure 1:
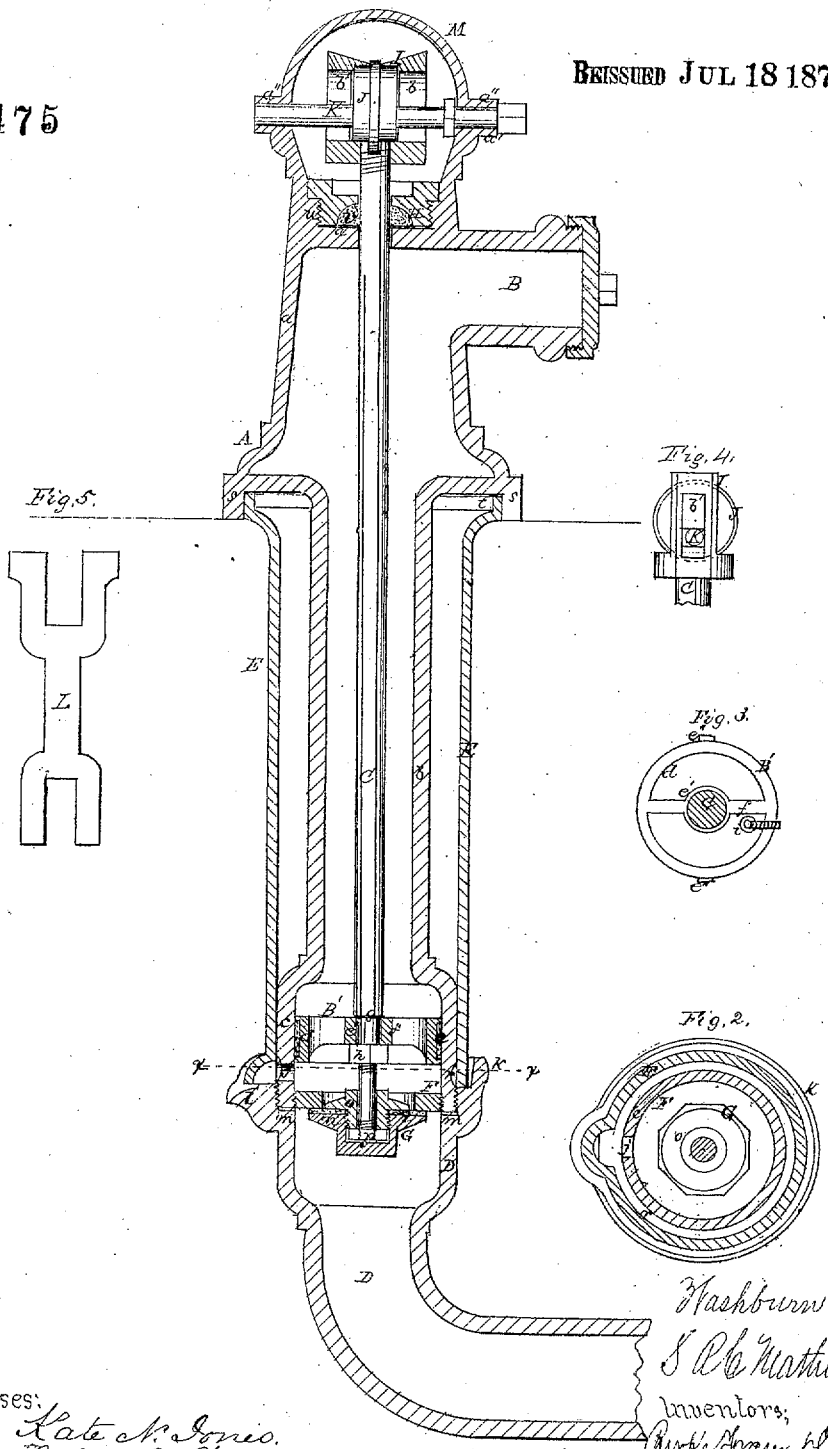

W. RACE, and S. R. C. MATTHEWS.

*Improvement in Hydrants.*

4475

REISSUED JUL 18 1871

Witnesses:
Kate N. Jones.
Wheeler N. Phillips

Washburn Race,
S. R. C. Matthews,
Inventors;
Per
Burke Fraser & Dogood
attys

UNITED STATES PATENT OFFICE.

WASHBURN RACE, OF LOCKPORT, NEW YORK, AND S. R. C. MATHEWS, OF PHILADELPHIA, PENNSYLVANIA, ASSIGNORS TO S. R. C. MATHEWS.

IMPROVEMENT IN HYDRANTS.

Specification forming part of Letters Patent No. 19,206, dated January 26, 1858; reissue No. 4,475, dated July 18, 1871.

*To all whom it may concern:*

Be it known that we, WASHBURN RACE, formerly of Seneca Falls, New York, but now of the city of Lockport, in the county of Niagara and State of New York, and S. R. C. MATHEWS, now of the city of Philadelphia, in the State of Pennsylvania, formerly of Seneca Falls aforesaid, did invent certain new and useful Improvements in Fire-Hydrants or Plugs; and we do hereby declare that the following is a full and exact description thereof, reference being had to the accompanying drawing making part of this specification.

Figure 1 is a central vertical section of our improved hydrant; Fig. 2, a horizontal section in line *x x;* Fig. 3, a plan of the annular yoke and waste-valve; Fig. 4, a view of the device by which the valve-rod is operated; Fig. 5, a view of the wrench.

Like letters indicate corresponding parts in all the figures.

The invention consists: 1st, in the employment of a loose case or jacket around the body of the hydrant, whereby both the hydrant and case, or the hydrant alone, may be detached and removed or withdrawn, as hereinafter set forth. 2d, in the employment of a dead-air or non-conducting chamber around the stock of the hydrant, below the surface of the ground, by means of the inclosing-jacket. 3d, in the use of a guide or yoke for steadying the valve-rod and centering the valve. 4th, in the manner of constructing the valve for facilitating the removal and replacing of the packing without removing the valve-rod. 5th, in the construction and arrangement of the main-valve and a waste-valve, whereby the latter is opened as the induction-pipe is closed, and vice versa.

In the drawing, A indicates the hydrant, the upper portion *a* being of any appropriate form, and provided with one or more nozzles, B, and the lower part or stock *b* being preferably of smaller diameter and extending below the surface of the ground, and attached to the pipe D by a screw-joint, or in any other suitable manner. Outside the stock *b* is situated a case or jacket, E, which forms an independent piece in itself, inclosing the stock of the hydrant, and protecting it from the packing of earth and from the effects of frost. This jacket extends to the surface of the ground, or a little above, where it may form a loose connection with the part A of the hydrant, so that the latter, with the stock *b*, may be detached from the main and removed without disturbing the jacket. The annular chamber of confined air between the jacket and stock forms a superior non-conductor for the protection of the hydrant from freezing—one which is better than any packing material such as is usually employed, which absorbs moisture and thereby loses its non-conducting qualities. In the lower part of the stock *b* is situated an annular valve, B′. This consists of a ring, *d*, which is preferably grooved circumferentially in its exterior surface to receive a packing, *e*, to be used in connection with the valve G for a purpose presently to be described. The ring *d* is provided with one or more cross-bars, *f*, connecting it with a hub or boss, *e′*, at its center, in which the lower part of a rod, C, is fitted, said rod having a shoulder, *g*, formed on it, which serves as a bearing for the upper edge of the hub or boss, against which it is held by a nut, *h′*. Through the ring *d* of the valve B′ a set-screw, *i*, passes, at a point directly opposite an opening, *j*, in the stock, for the purpose of setting it tightly against the waste-opening in case of wear. The ring *d* of the annular valve B′ may be provided with lugs *e″*, as shown in Fig. 3, said lugs fitting in grooves in the case in order to prevent the valve from turning casually. This yoke is fitted in a bored portion of the stock, and, as the rod C is raised and lowered in opening and closing the valve G, it serves as a guide and support for steadying the valve-rod, and preventing vibration by bearing equally against all sides of the interior of the stock or chamber in which it works, and insures the perfect centering of the valve on its seat at all times when closed. Within the lower part of the stock *b* a screw-thread is formed to receive an annular valve-seat, F. A valve, G, is provided, which is formed of the parts *n o*, the part *n* being of cup-form and containing a nut, *p*, by which the valve G is secured to the rod C, a screw-thread being on the lower end of the rod. The other part *o* of the valve is a cap, which is screwed down upon a packing, *q*, which, when said valve is closed, bears against the seat F, as plainly shown in Fig. 1. The valve G is allowed to turn freely on the rod C. This construction obviates a heretofore existing difficulty, viz., that when the valve-packing had to be replaced it was necessary to remove the valve-rod, and, after putting in new packing, true it in a lathe. By my construction the packing can be replaced by merely unscrewing the part *n*, without removing the rod, and no fitting is afterward required. Around the lower end of the stock a groove, *r*, is made, said groove being in the same plane with the opening *j* on the part *b*, and the spout or nozzle *l* on the pipe D. In the upper end of the part *a* of the case A there is screwed a cup, H. The cup H is screwed into a recess, *u*, in which packing *v* is placed, the above parts forming a stuffing-box. To the upper end of the rod C a yoke, I, is attached, and a cam or eccentric, J, is fitted within the yoke. The cam J is placed upon a shaft, K, which has its bearings in a flanch, *a''*, on the upper part, *a*. One end of the shaft K projects beyond the edge of the flanch, and has a square formed on it to receive a wrench, L, shown in Fig. 5. The sides of the yoke I are slotted vertically, as shown at *b'*, Fig. 4, the shaft K passing through said slots. The yoke I is covered by a cap, M, the lower edge of which is provided with a flanch, *a''*, which is fitted to the flanch *a'* of the case, and secured to it by screw-bolts. The upper end of the cup H has grooves or recesses made in it to receive one end of the wrench L for the purpose of turning the cup.

The operation is as follows: By applying the wrench L to the square on the shaft K the cam or eccentric J may be turned without raising or moving the cap M, and the rod C may be raised or lowered thereby. When the rod C is raised the valve G bears against its seat F, and the water from the main is prevented from passing into the case A of the hydrant; and when the valve G is closed the valve B' is above the opening *j*, and, therefore, the water within the case A may pass out through the opening *j* into groove *r*, and out at spout or nozzle *l*. When the rod C is lowered the valve G opens and the annular valve B' passes over the opening *j*, closing the same, while the water from the main passes up through the seat F, through the case A, and out through nozzle B. Thus it will be seen that when the water is admitted into the case the escape-passage *j* is closed, and when the water is shut off the said passage *j* is opened.

A great advantage of the case or jacket E results from its being free or independent of the other parts, so that if any of the parts require repairs the hydrant can be removed from place by simply disconnecting from the main-pipe D, and without disturbing the case E or the earth around it. Or, if the main pipe itself, or its parts at the connection of the hydrant with it, are deranged, the loose case can be removed with the hydrant, which would not be the case were it to form a solid part of the main. These advantages result from the special use of the detached case or jacket.

We are aware that hydrants have been constructed with a case or extension which forms a fixed part of the main or elbow to facilitate the removal of the hydrant without excavating. Such we do not claim. But we are not aware that a loose or detached case has ever before been used to form a confined-air chamber around the stock, and so that both the hydrant and the case, or the hydrant alone, can be removed. Therefore,

What we claim as our invention is—

1. The protecting case or jacket E surrounding the stock or body of the hydrant in such a manner that both the hydrant and the case, or the hydrant alone, may be detached and removed, substantially as and for the purpose set forth.

2. The dead-air or non-conducting chamber formed between the stock *b* and inclosing-jacket E, arranged intermediately between the main pipe D and top *a*, substantially as and for the purpose set forth.

3. The annular yoke B' on the valve-rod C for steadying the rod C and centering the valve G, and also preventing any vibration of said rod or valve when the hydrant is opened, as set forth.

4. The valve G, constructed of the two parts *n o* and packing *q*, in combination with the rod C, substantially as and for the purpose set forth.

5. The annular valve B' and the disk-valve G attached to the rod C, in combination with the escape or leak-openings *j*, when arranged to operate as and for the purposes set forth.

WASHBURN RACE.
S. R. C. MATHEWS.

Witnesses to W. RACE:
CHARLES H. SQUIRES,
GENEVIEVE D. RACE.

Witnesses to S. R. C. MATHEWS:
HUGH P. HUDSON,
T. P. BAYES.